United States Patent
Tagawa et al.

(10) Patent No.: US 9,441,584 B2
(45) Date of Patent: Sep. 13, 2016

(54) AIRFLOW MEASURING DEVICE

(71) Applicant: DENSO CORPORATION, Kariya, Aichi-pref. (JP)

(72) Inventors: Hiroshi Tagawa, Nagoya (JP); Akiyuki Sudou, Takahama (JP)

(73) Assignee: DENSO CORPORATION, Kariya (JP)

( * ) Notice: Subject to any disclaimer, the term of this patent is extended or adjusted under 35 U.S.C. 154(b) by 257 days.

(21) Appl. No.: 14/466,087

(22) Filed: Aug. 22, 2014

(65) Prior Publication Data

US 2015/0096360 A1    Apr. 9, 2015

(30) Foreign Application Priority Data

Oct. 4, 2013   (JP) .................................. 2013-209044

(51) Int. Cl.
| | |
|---|---|
| *G01F 1/696* | (2006.01) |
| *F02M 35/10* | (2006.01) |
| *G01F 1/684* | (2006.01) |
| *G01F 1/692* | (2006.01) |

(52) U.S. Cl.
CPC ...... *F02M 35/10386* (2013.01); *G01F 1/6842* (2013.01); *G01F 1/6845* (2013.01); *G01F 1/692* (2013.01)

(58) Field of Classification Search
CPC .... G01F 1/6842; G01F 1/684; G01F 1/6845; G01F 15/14; G01F 1/692; F02M 35/10386
USPC ..................................................... 73/114.32
See application file for complete search history.

(56) References Cited

U.S. PATENT DOCUMENTS

| | | | | |
|---|---|---|---|---|
| 6,805,002 | B2 * | 10/2004 | Yonezawa | G01F 15/18 73/204.22 |
| 7,469,582 | B2 * | 12/2008 | Saito | G01F 1/6842 73/204.22 |
| 7,805,990 | B2 * | 10/2010 | Lang | G01F 1/6842 73/204.22 |
| 8,677,811 | B2 * | 3/2014 | Tagawa | G01F 1/684 73/114.32 |
| 8,701,474 | B2 * | 4/2014 | Tagawa | G01F 1/6842 73/114.32 |
| 8,904,854 | B2 * | 12/2014 | Goka | G01F 1/6842 73/114.32 |
| 8,916,074 | B2 * | 12/2014 | Takiguchi | G01F 1/6842 264/251 |
| 2011/0296904 | A1 * | 12/2011 | Tagawa | G01F 1/684 73/114.32 |

FOREIGN PATENT DOCUMENTS

JP        2011-252796 A     12/2011

\* cited by examiner

*Primary Examiner* — Freddie Kirkland, III

(57) ABSTRACT

A sensor assembly includes a sensor chip, a circuit board, and a wire holding case. The wire holding case holds a bonding wire, which connects the sensor chip with the circuit board. The wire holding case is inserted in an insertion hole of a case. The wire holding case has a low rigidity portion and a high rigidity portion in an X direction. The low rigidity portion has a space accommodating the bonding wire. The high rigidity portion has a reference surface in contact with an inner periphery of the insertion hole to position the wire holding case in a Y direction. The high rigidity portion has a surface on the opposite side of the reference surface in the Y direction. The surface is biased from a projection, which is formed on the inner periphery of the insertion hole, in the Y direction.

2 Claims, 6 Drawing Sheets

FIG. 8   COMPARISON EXAMPLE
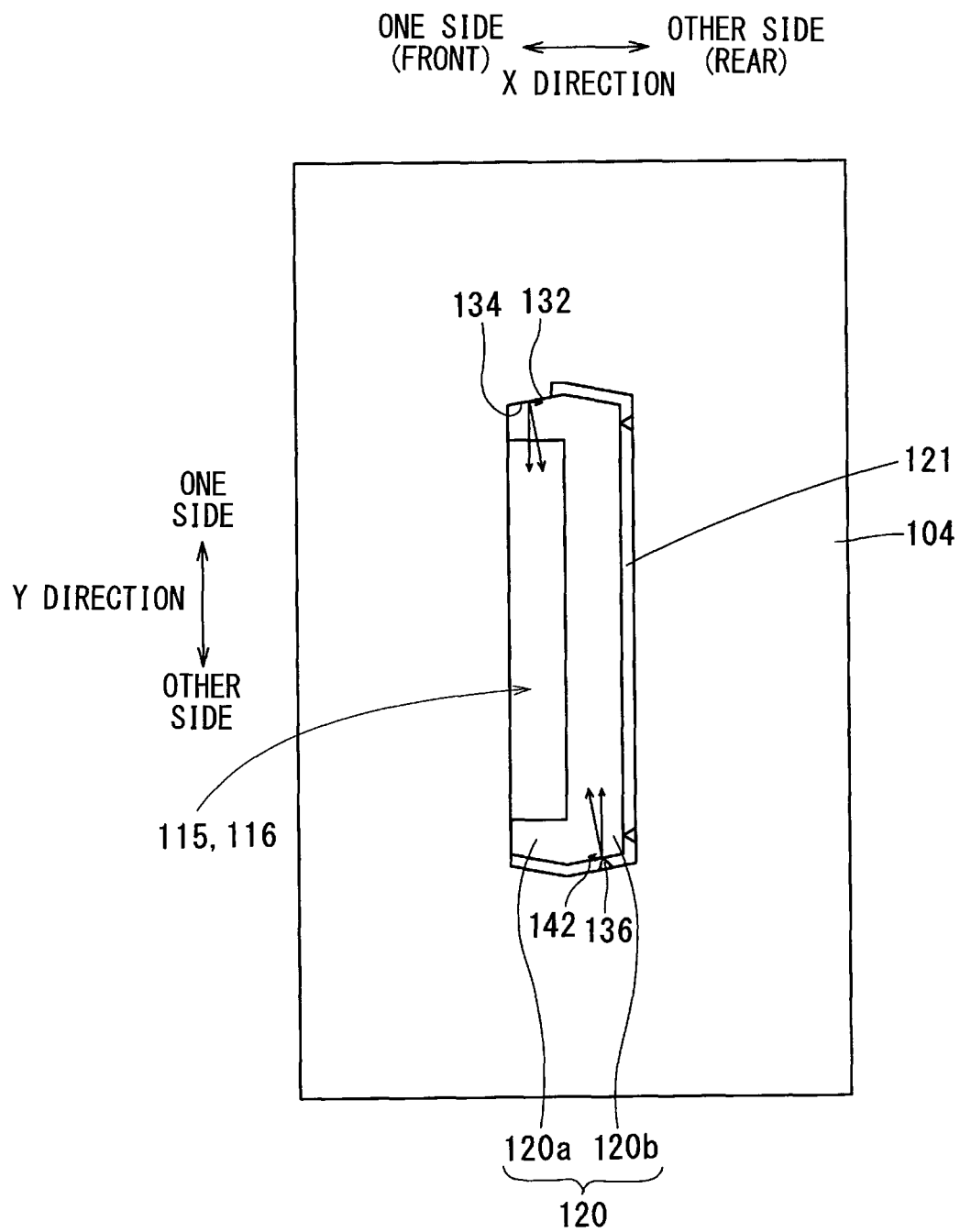

AIRFLOW MEASURING DEVICE

CROSS REFERENCE TO RELATED APPLICATION

This application is based on reference Japanese Patent Application No. 2013-209044 filed on Oct. 4, 2013, the disclosure of which is incorporated herein by reference.

TECHNICAL FIELD

The present disclosure relates to an airflow measuring device. The airflow measuring device may be equipped to, for example, an air intake passage of an engine and maybe configured to measure a flow rate of air drawn into the engine.

BACKGROUND

Conventionally, a known thermal-type airflow measuring device may be equipped to an air intake passage of an engine. The airflow measuring device may be configured to draw a part of air, which flows through the air intake passage, and to cause heat transfer with the drawn air, thereby to measure a flow rate of air drawn into the engine. The conventional airflow measuring device may include a case and a sensor assembly. The case may form an inner passage to flow drawn air therethrough. The sensor assembly may include a sensor chip and a circuit board. The sensor chip may be in a plate shape and may be configured to cause heat transfer with air and to generate an electric signal according to transferred heat. The circuit board may be electrically connected with the sensor chip via a bonding wire.

The sensor assembly may be inserted into and affixed to an insertion hole, which may be formed in the case, such that the sensor chip may be exposed to the inner passage. The sensor assembly may include a wire holding case to hold the bonding wire. The outer periphery of the wire holding case may have a reference surface, which may be configured to make surface contact with the inner circumferential periphery of the insertion hole for positioning the wire holding case. According to the configuration of Patent Document 1, the wire holding case has a surface, which is on the opposite side of the reference surface, and the surface may be biased from a projection, which is formed on the inner circumferential periphery of the insertion hole. Thus, the sensor assembly may be affixed to the insertion hole.

The wire holding case may have a space for accommodating the bonding wire. Accordingly, the wire holding case may decrease in rigidity around the space. That is, the wire holding case may include a low rigidity portion, which is easily deformed. It is presumable to determine the reference surface without consideration of the low rigidity portion. In this case, the projection may apply load, when the wire holding case is mounted to the insertion hole, to bend the wire holding case. Consequently, distortion may occur in the bonding wire and the sensor chip. Thus, accuracy of flow detection may be impaired.

PATENT DOCUMENT 1

Publication of unexamined Japanese patent application No. 2011-252796

SUMMARY

It is an object of the present disclosure to produce an airflow measuring device including a sensor assembly, which is inserted into and affixed to an insertion hole of a case, and having a configuration to reduce deformation caused in a wire holding case inside the insertion hole.

According to an aspect of the present disclosure, an airflow measuring device is equipped to an air intake passage of an engine. The airflow measuring device is configured to draw a part of air, which flows through the air intake passage, and to cause heat transfer with the drawn air to measure a flow rate of air drawn into the engine. The airflow measuring device comprises a case having an inner passage configured to pass the drawn air therethrough. The airflow measuring device further comprises a sensor assembly including a sensor chip and a circuit board. The sensor chip is in a plate shape and is configured to generate an electric signal according to the heat transfer. The circuit board is electrically connected with the sensor chip via a bonding wire. The sensor assembly further includes a wire holding case holding the bonding wire. The wire holding case is inserted in an insertion hole of the case in an insertion direction to expose the sensor chip to the drawn air in the inner passage. A thickness direction of the sensor chip is an X direction, and a Y direction is perpendicular to the X direction, when being viewed along the insertion direction. The wire holding case has a low rigidity portion on one side in the X direction and a high rigidity portion on an other side in the X direction. The low rigidity portion has a space accommodating the bonding wire. The high rigidity portion is higher than the low rigidity portion in rigidity. The high rigidity portion has a reference surface, which is in contact with an inner periphery of the insertion hole to position the wire holding case in the Y direction. The inner periphery of the insertion hole has a projection. The high rigidity portion has a surface on an opposite side of the reference surface in the Y direction. The surface is biased from the projection in the Y direction.

BRIEF DESCRIPTION OF THE DRAWINGS

The above and other objects, features and advantages of the present invention will become more apparent from the following detailed description made with reference to the accompanying drawings. In the drawings:

FIG. 8 is a view showing balance among forces applied to a wire holding case, according to a comparison example.

DETAILED DESCRIPTION

As follows, embodiment of the present disclosure will be described.

EMBODIMENT (Configuration of Embodiment)

Figure 1:
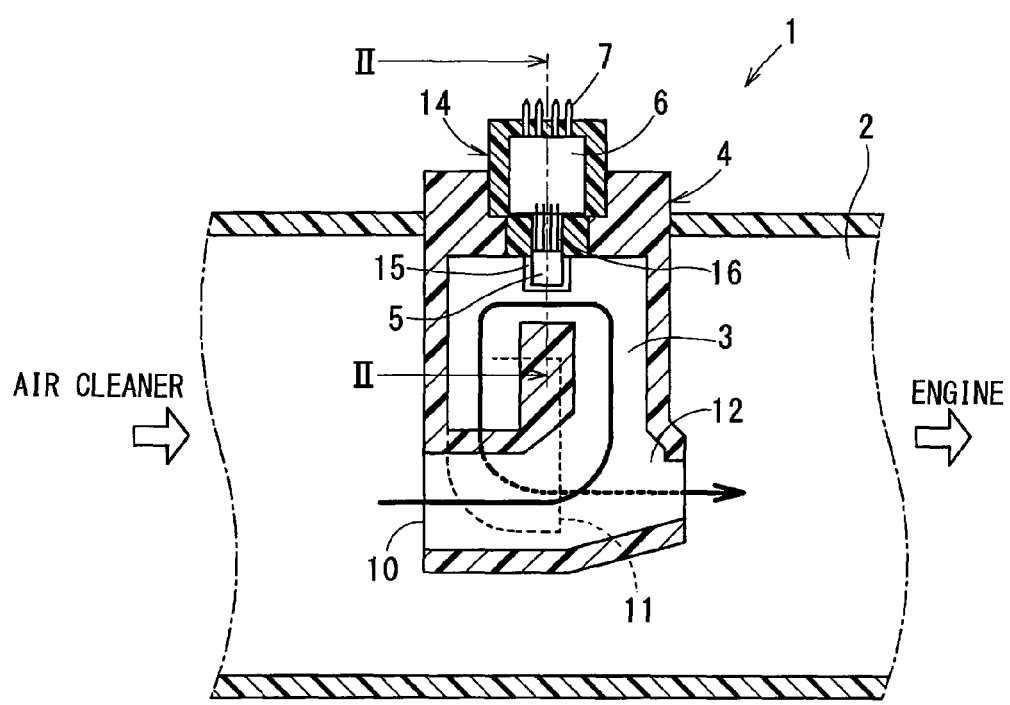
FIG. 1 is a sectional view showing an interior of an airflow measuring device according to an embodiment.

Configuration of an airflow measuring device 1 according to an embodiment will be described with reference to FIGS. 1 to 6. As shown in FIG. 1, the airflow measuring device 1 is projected into an air intake passage 2 of an engine to measure a flow rate of air drawn into the engine.

The airflow measuring device 1 receives a part of air, which flows through the air intake passage 2, and causes heat transfer with drawn air, thereby to measure a mass flow rate as an air flow rate directly. The airflow measuring device 1 includes a case 4 and a sensor chip 5. The case 4 forms an inner passage 3 through which drawn air passes. The sensor chip 5 is located in the inner passage 3. The sensor chip 5 causes heat transfer with drawn air and generates an electric signal corresponding to the air flow rate.

The airflow measuring device 1 further includes a circuit module 6, an external terminal 7, and/or the like. The circuit module 6 processes the electric signal generated by the sensor chip 5. The external terminal 7 is for sending an electric signal, which is processed by the circuit module 6, to an external electronic control unit (ECU). The ECU obtains the flow rate of air drawn into the engine according to the electric signal sent from the airflow measuring device 1. The ECU further implements various kinds of controls, such as fuel injection control, according to the air flow rate.

The case 4 has, for example, an inlet port 10, the inner passage 3, an exhaust port 11, and/or the like. The inlet port 10 opens toward the upstream of the air intake passage 2 and draws a part of air, which flows through the air intake passage 2. The inner passage 3 enables air, which is drawn from the inlet port 10, to pass therethrough. The inner passage 3 accommodates the sensor chip 5. The exhaust port 11 opens toward the downstream of the air intake passage 2. The exhaust port 11 returns air, which is drawn from the inlet port 10 to pass around the sensor chip 5, into the air intake passage 2. The sensor chip 5 causes heat transfer with air drawn from the inlet port 10 and generates the electric signal representing the mass flow rate.

For example, the inner passage 3 causes air, which is drawn from the inlet port 10, to flow therearound and to flow out of the exhaust port 11. A dust discharging passage 12 is branched from the inner passage 3 to flow dust, which is contained in the drawn air, to pass straight therethrough. Thus, the dust discharging passage 12 discharges the dust.

Figure 4:
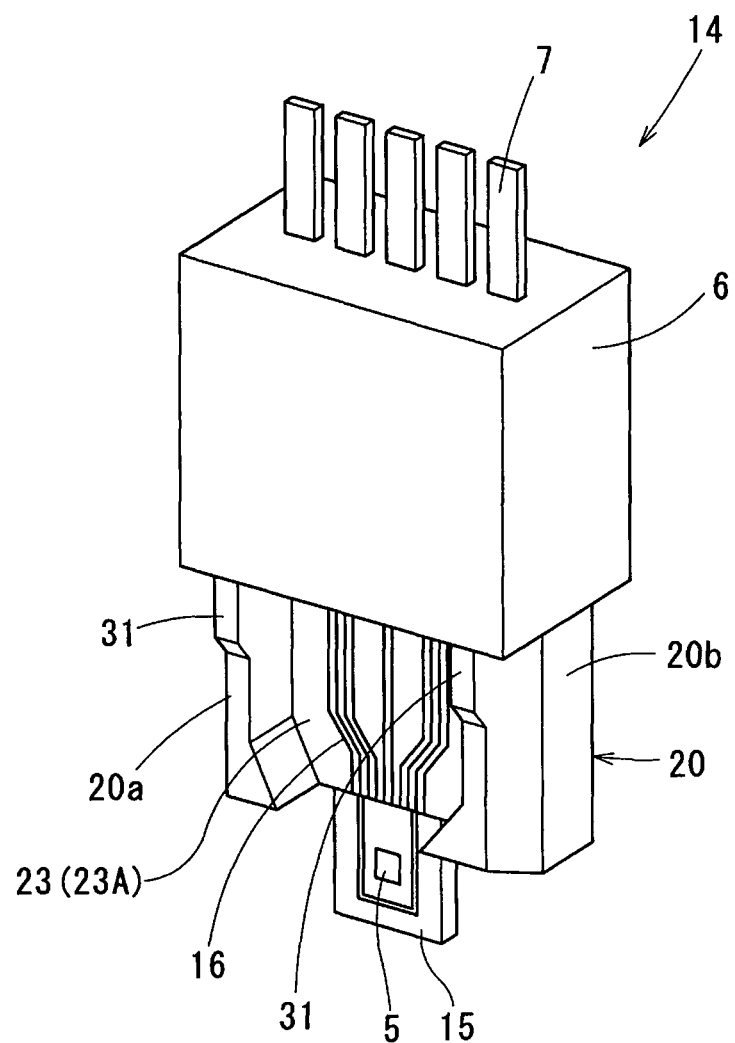
FIG. 4 is a perspective view showing a sensor assembly of the airflow measuring device according to the embodiment.

As shown in FIG. 4, the sensor chip 5, the circuit module 6, the external terminal 7, and/or the like are assembled together into a sensor assembly 14 as one component. The sensor assembly 14 is inserted into the case 4 and is affixed to the case 4, such that the sensor chip 5 is exposed to the inner passage 3. In the assembly of the sensor assembly 14, the circuit module 6 and the external terminal 7 are insert-molded in the sensor assembly 14. In addition, the sensor chip 5 is adhered to a holder portion 15 and affixed to the holder portion 15. Thus, the sensor chip 5 is assembled to the sensor assembly 14. The holder portion 15 is formed simultaneously with the insert molding.

The sensor chip 5 includes an exothermic element and a temperature sensing element, which are thin film resistive elements formed on a surface of a semiconductor circuit board. The elements are connected to a circuit board (not shown) housed in the circuit module 6. The sensor chip 5 is in a plate shape and has a detector plane on one side relative to the thickness direction. The elements are equipped on the detector plane of the sensor chip 5. The elements of the sensor chip 5 and the circuit board of the circuit module 6 are conducted with a bonding wire 16.

(One Feature of Embodiment)

As follows, one feature of the airflow measuring device 1 according to the embodiment will be described. The sensor assembly 14 includes a wire holding case 20, which functions as a casing to hold the bonding wire 16. The wire holding case 20 is a resin portion formed in the insert molding. The wire holding case 20 is formed between the resin portion, which contains the circuit module, and the holder portion 15.

Figure 5:
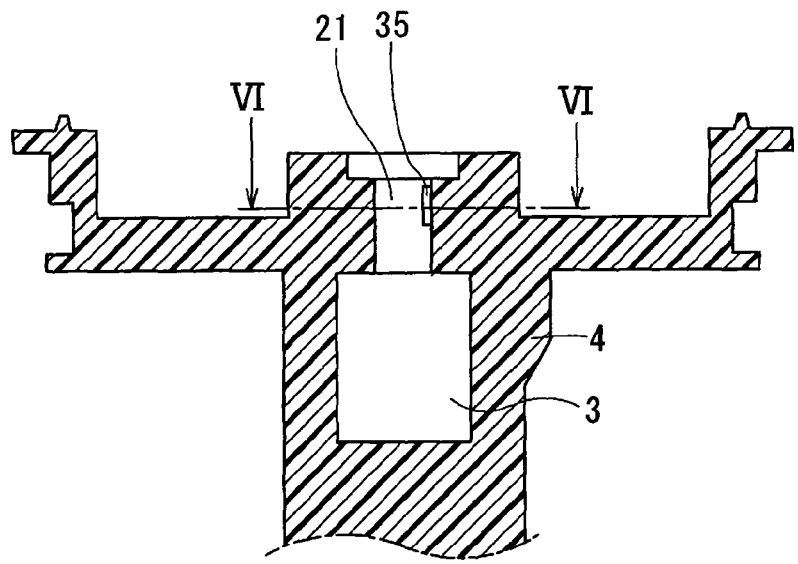
FIG. 5 is a sectional view showing a case of the airflow measuring device according to the embodiment.
Figure 6:
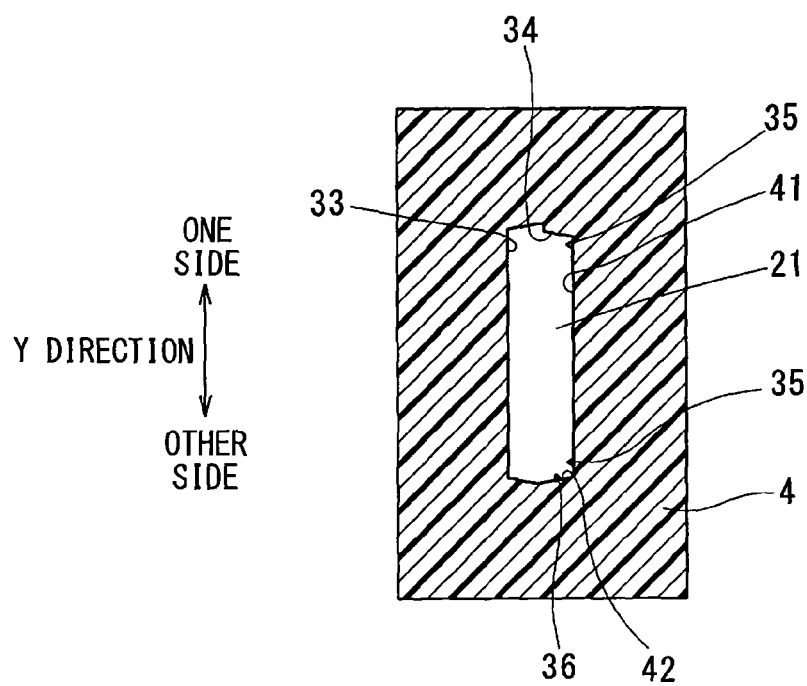
FIG. 6 is a sectional view taken along a line VI-VI in FIG. 5 and according to the embodiment.

The case 4 has an insertion hole 21, into which the wire holding case 20 is inserted, such that the sensor chip 5 is exposed to the inner passage 3. As shown in FIG. 5, the insertion hole 21 is a through hole formed in the case 4 to extend between the inside of the inner passage 3 and the outside of the inner passage 3 through the wall of the case 4.

When being viewed along the insertion direction of the insertion hole 21, the thickness direction of the sensor chip 5 is an X direction, and a direction perpendicular to the X direction is a Y direction. The wire holding case 20 has a low rigidity portion 20a on one side in the X direction. The low rigidity portion 20a has a space 23 accommodating the bonding wire. The wire holding case 20 has a high rigidity portion 20b on the other side in the X direction. The high rigidity portion 20b has rigidity higher than rigidity of the low rigidity portion 20a.

Figure 2:
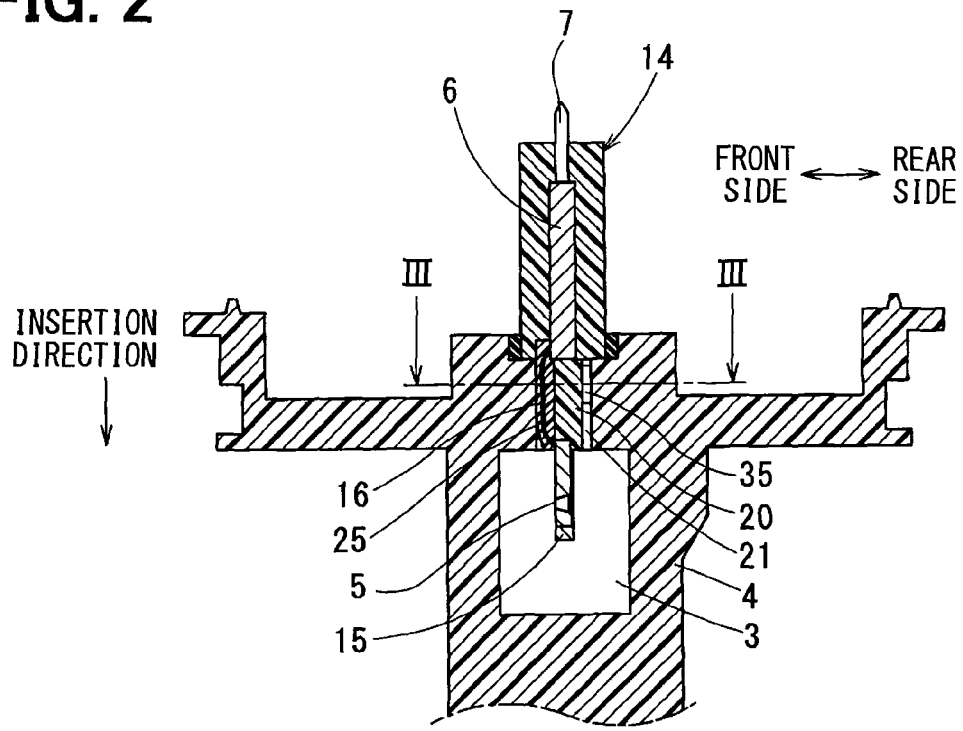
FIG. 2 is a sectional view taken along a line II-II in FIG. 1 and according to the embodiment.
Figure 3:
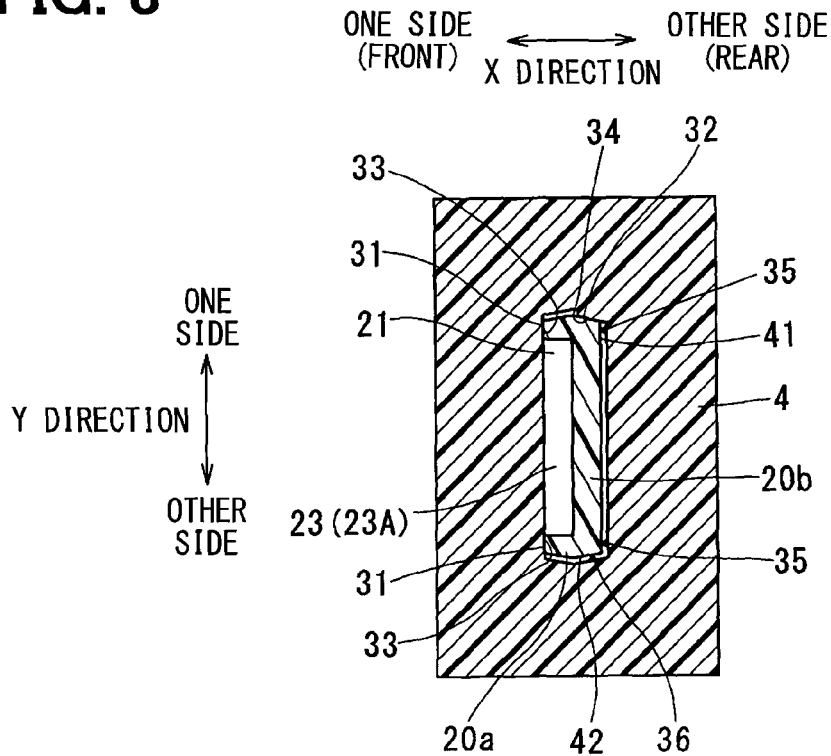
FIG. 3 is a sectional view taken along a line III-III in FIG. 2 and according to the embodiment.

As shown in FIGS. 3 and 4, the space 23 is formed as, for example, a recessed portion 23A. The recessed portion 23A opens on the surface on the one side in the X direction. Referring to FIG. 2, the bonding wire 16 is located in the recessed portion 23A. The bonding wire 16 is embedded in a potting material 25 thereby being protected. In FIGS. 3 and 4, illustration of the potting material 25 is omitted. The one side in the X direction corresponds to a surface side of the sensor chip 5.

The wire holding case 20 has a reference surface, which makes surface contact with the inner circumferential periphery of the insertion hole 21. The wire holding case 20 has first reference surfaces 31 on the one side in the X direction. The first reference surfaces 31 are for positioning in the X direction. The high rigidity portion 20b of the wire holding case 20 has a second reference surface 32 on the one side in the Y direction. The second reference surface 32 is for positioning in the Y direction.

The wire holding case 20 is press-fitted to the insertion hole 21, such that the first reference surfaces 31 make surface contact with a contact surface 33, and the second reference surface 32 makes surface contact with a contact surface 34. The contact surface 33 is formed on the inner circumferential periphery of the insertion hole 21. The contact surface 34 is formed on the inner circumferential periphery of the insertion hole 21.

Press-fitting projections 35 and 36 are formed on the inner circumferential periphery of the insertion hole 21 at positions, to which the contact surfaces 33 and 34 are opposed, respectively. In the present configuration, a surface 41 is located on the opposite side of the wire holding case 20 from the first reference surfaces 31. In addition, the surface 41 is biased from the press-fitting projection 35. Therefore, the first reference surfaces 31 are biased onto the contact surface 33. A surface 42 is located on the opposite side of the wire holding case 20 from the second reference surface 32. In addition, the surface 42 is biased from the press-fitting projection 36. Therefore, the second reference surface 32 is biased onto the contact surface 34.

It is noted that, in the present embodiment, the position, at which the second reference surface 32 is in contact with the contact surface 34, is substantially the same as the position, at which the surface 42 is in contact with the press-fitting projection 36, in the X direction. Specifically, the second reference surface 32 is in contact with the contact surface 34 in a contact range in the X direction. A center position of the contact range is substantially the same as the position, at which the surface 42 is in contact with the press-fitting projection 36, in the X direction.

The first reference surfaces 31 are formed at two locations on the opening periphery of the recessed portion 23A. The recessed portion 23A is interposed between the first reference surfaces 31 in the Y direction.

(One Effect of Embodiment)

The airflow measuring device 1 has the high rigidity portion 20b. The high rigidity portion 20b has the second reference surface 32. The second reference surface 32 makes contact with the inner circumferential periphery of the insertion hole 21 to position the wire holding case 20 in the Y direction. With the present configuration, load applied to the wire holding case 20 entirely works onto the high rigidity portion, as the wire holding case 20 is positioned and affixed in the Y direction. Therefore, the present configuration enables to reduce deformation of the wire holding case.

Figure 7:
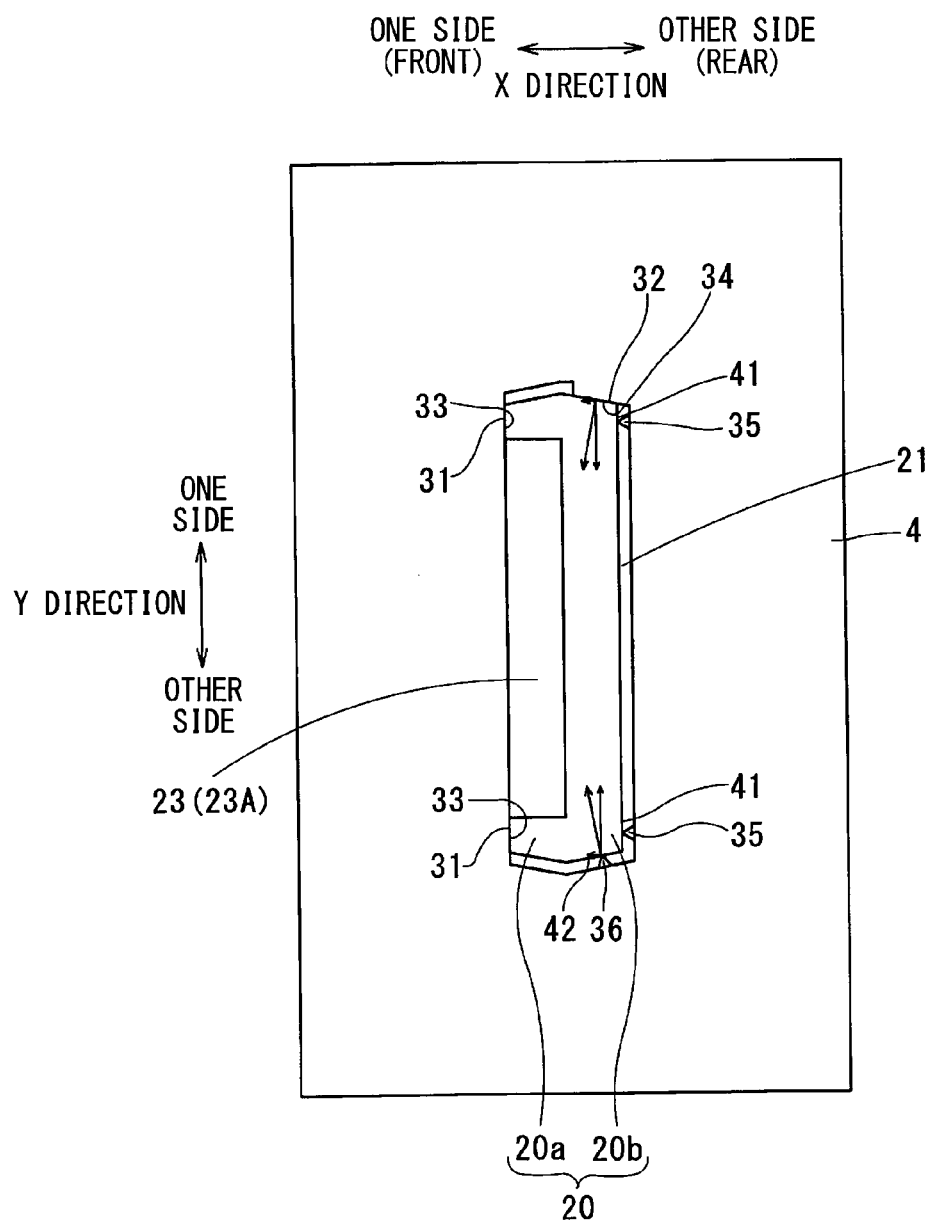
FIG. 7 is a view showing balance among forces applied to the wire holding case, according to the embodiment.

FIG. 7 shows a condition in which forces are applied to the wire holding case 20, as the wire holding case 20 is positioned and affixed in the Y direction, and shows balance among the forces. In FIG. 7, the second reference surface 32 receives a load, which is equivalent to a load applied from the press-fitting projection 36 onto the surface 42. In the present embodiment, both the second reference surface 32 and the surface 42, which is biased from the press-fitting projection 36, are on the high rigidity portion 20b. Therefore, load is applied to the high rigidity portion 20b from both the one side and the other side in the Y direction.

FIG. 8 shows an example according to a comparison example. In FIG. 8, forces are applied from a case 104 onto a wire holding case 120 inside an insertion hole 121, and the forces are balanced. In FIG. 8, a low rigidity portion 120a has a second reference surface 132. In the example of FIG. 8, a high rigidity portion 120b has a surface 142, onto which force is applied from the press-fitting projection 136. The low rigidity portion 120a has a surface 134, onto which force is applied from the second reference surface 132. It is noted that, as described before, the second reference surface 132 resides on the low rigidity portion 120a. Therefore, load is applied onto the low rigidity portion 120a on the one side in the Y direction, and load is also applied onto the high rigidity portion 120b on the other side in the Y direction. Consequently, the low rigidity portion 120a may cause large deformation. Thus, the wire holding case 120 may deform to cause distortion in a bonding wire 116 and/or a sensor chip 115 on the wire holding case 120.

To the contrary, according to the present embodiment, as shown in FIG. 7, load is applied to the high rigidity portion 20b on both the one side and the other side in the Y direction. Therefore, the present configuration enables to reduce deformation caused in the wire holding case 20. Consequently, the present configuration may enable to restrict the bonding wire 16 and/or the sensor chip 5 from causing distortion, and thereby to enable to enhance accuracy of flow measurement.

In addition, according to the present embodiment, the position, at which the second reference surface 32 is in contact with the contact surface 34, is substantially the same as the position, at which the surface 42 is in contact with the press-fitting projection 36, in the X direction. The present configuration may enable to restrict the wire holding case 20 from causing distortion further compared with a configuration in which the position, at which the second reference surface is in contact with the contact surface, is shifted relative to the position, at which the surface is in contact with the press-fitting projection, in the X direction.

It is noted that, according to the present embodiment, each of the second reference surface 32 and the surface 42 is inclined relative to the Y direction, thereby to cause component forces. It is further noted that, each of the second reference surface 32 and the surface 42 may be a flat surface perpendicular to the Y direction.

According to the present disclosure, the airflow measuring device is equipped to the air intake passage of the engine. The airflow measuring device is configured to draw a part of air, which flows through the air intake passage, and to cause heat transfer with the drawn air, thereby to measure the flow rate of air drawn into the engine.

The airflow measuring device includes the case and the sensor assembly. The case forms the inner passage to flow drawn air therethrough. The sensor assembly includes the sensor chip and the circuit board. The sensor chip is in the plate shape and is configured to cause heat transfer with air and to generate the electric signal according to the heat transfer. The circuit board is electrically connected with the sensor chip via the bonding wire.

The sensor assembly includes the wire holding case, which functions as the casing to hold the bonding wire. The case has the insertion hole, into which the wire holding case is inserted to enable the sensor chip to be exposed to the inner passage.

The thickness direction of the sensor chip is the X direction, and the direction perpendicular to the X direction is the Y direction, when being viewed along the insertion direction of the insertion hole. The wire holding case has the low rigidity portion on the one side in the X direction and the high rigidity portion on the other side in the X direction. The low rigidity portion has the space accommodating the bonding wire. The high rigidity portion has the rigidity higher than the rigidity of the low rigidity portion.

The high rigidity portion has the reference surface, which makes contact with the inner periphery of the insertion hole to position the wire holding case in the Y direction. A surface on the opposite side of the reference surface relative to the Y direction is biased from the projection in the Y direction, which is formed on the inner periphery of the insertion hole.

With the present configuration, load applied to the wire holding case entirely works selectively onto the high rigidity portion, when the wire holding case is positioned and affixed in the Y direction. That is, the low rigidity portion may be restricted from application of force in the Y direction. Therefore, the present configuration enables to reduce deformation of the wire holding case.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An airflow measuring device equipped to an air intake passage of an engine, the airflow measuring device configured to draw a part of air, which flows through the air intake passage, and to cause heat transfer with the drawn air to measure a flow rate of air drawn into the engine, the airflow measuring device comprising:
   a case having an inner passage configured to pass the drawn air therethrough; and
   a sensor assembly including a sensor chip and a circuit board, wherein
   the sensor chip is in a plate shape and is configured to generate an electric signal according to the heat transfer,
   the circuit board is electrically connected with the sensor chip via a bonding wire,
   the sensor assembly further includes a wire holding case holding the bonding wire,
   the wire holding case is inserted in an insertion hole of the case in an insertion direction to expose the sensor chip to the drawn air in the inner passage,
   a thickness direction of the sensor chip is an X direction, and a Y direction is perpendicular to the X direction, when being viewed along the insertion direction,
   the wire holding case has a low rigidity portion on one side in the X direction and a high rigidity portion on an other side in the X direction,
   the low rigidity portion has a space accommodating the bonding wire,
   the high rigidity portion is higher than the low rigidity portion in rigidity,
   the high rigidity portion has a reference surface, which is in contact with an inner periphery of the insertion hole to position the wire holding case in the Y direction,
   the inner periphery of the insertion hole has a projection,
   the high rigidity portion has a surface on an opposite side of the reference surface in the Y direction, and
   the surface is biased from the projection in the Y direction.

2. The airflow measuring device according to claim 1, wherein the reference surface and the projection are at the same position relative to the X direction.

* * * * *